(12) United States Patent
Shepard

(10) Patent No.: US 7,306,112 B2
(45) Date of Patent: Dec. 11, 2007

(54) SPILL-PROOF CONTAINER

(75) Inventor: Bradley K. Shepard, Wilmington, NC (US)

(73) Assignee: Loopa, LLC, Charlotte, NC (US)

( * ) Notice: Subject to any disclaimer, the term of this patent is extended or adjusted under 35 U.S.C. 154(b) by 671 days.

(21) Appl. No.: 10/834,631

(22) Filed: Apr. 29, 2004

(65) Prior Publication Data

US 2005/0242100 A1   Nov. 3, 2005

(51) Int. Cl.
*B65D 25/04* (2006.01)
*A47G 19/32* (2006.01)

(52) U.S. Cl. .................. 220/506; 220/603; 220/629

(58) Field of Classification Search ............... 215/11.4; 220/4.21, 23.83, 23.86, 203.05, 203.06, 203.21, 220/252, 345.1, 506, 603, 629, 703, 714, 220/719, 734, 810; 222/427, 452
See application file for complete search history.

(56) References Cited

U.S. PATENT DOCUMENTS

| | | | |
|---|---|---|---|
| 1,509,734 A | | 9/1924 | Langley |
| 2,414,697 A | | 1/1947 | Pettersson |
| 4,189,066 A | * | 2/1980 | Berghahn ..................... 222/48 |
| 4,714,174 A | | 12/1987 | Williams |
| 4,908,066 A | | 3/1990 | Taylor et al. |
| 5,366,103 A | | 11/1994 | Abernathy et al. |
| 5,540,341 A | * | 7/1996 | Holley et al. ............... 215/11.4 |
| 5,724,914 A | | 3/1998 | Nemeth |
| 5,758,797 A | | 6/1998 | Martindale |
| 5,975,016 A | | 11/1999 | Wesenhagen |
| 6,032,824 A | | 3/2000 | Barrow |
| 6,176,384 B1 | | 1/2001 | Voloshin |
| 6,637,614 B2 | | 10/2003 | Bergkvist |
| 6,656,514 B1 | | 12/2003 | Tubbs |
| 2006/0016817 A1 | | 1/2006 | Sheppard, Jr. et al. |

OTHER PUBLICATIONS

"International Search Report" and "Written Opinion of the International Search Authority" (Korean Intellectual Property Office) in Bouncing Brain Productions Subsidiary 9, LLC et al. International Patent Application Serial No. PCT/US2006/031970, dated May 11, 2007, 6 pages.

* cited by examiner

*Primary Examiner*—Anthony D. Stashick
*Assistant Examiner*—Harry A Grosso
(74) *Attorney, Agent, or Firm*—Tillman Wright, PLLC; Chad D. Tillman; James D. Wright

(57) ABSTRACT

A spill-proof container is constructed of a bowl with an access opening for holding particulate material that is freely rotatable within the chamber of a bowl support having an access opening. The access openings of the bowl and support are aligned when the bowl and support are both in their upright orientation. When the support is tipped, the bowl, which is heavier at its bottom, remains upright. As a result, the chamber access opening rotates out of alignment with the bowl access opening, which is then covered with a part of the chamber wall.

20 Claims, 3 Drawing Sheets

SPILL-PROOF CONTAINER

BACKGROUND OF THE INVENTION

(1) Field of the Invention

The present invention relates to a spill-proof container, and in particular to a particulate material container with an access opening that closes when the container is tipped from its normal upright position, preventing contents spillage.

(2) Description of the Prior Art

Numerous spill-proof containers are described in the prior art for holding drinks or other liquids. When designed for use by children, such containers are commonly referred to as "sippy" cups. Spill-proof containers for liquids prevent liquid spillage by using a tubular member that extends into a larger outer container for holding a reservoir of liquid, or by using a valve arrangement adjacent the discharge opening, which is often sized to fit the user's mouth. These containers are not suitable for use in holding particulate material, whether or not a liquid is also present, since it is necessary for the user to have access, either by hand or a utensil, to the particulate material in order to remove the material from the container.

Several containers are also described in the prior art for use in holding particulate materials, or a combination of a particulate material and a liquid. These containers purport to hold particulate material in an easily accessible manner, while preventing discharge of material from the container when the container is tipped or inverted.

For example, U.S. Pat. No. 4,714,174 to Williams, describes a spill-proof container for dry granular foodstuffs, such as cereal, which is comprised of an outer container into which the foodstuff is placed, and a smaller, open-bottom container that extends into the outer container. A cover extends over the space between the outer and inner containers. The user reaches through the inner container into the outer container to remove the foodstuff. If the container is tipped, the foodstuff is held within the space between the containers. Due to the configuration required to prevent spillage, the outer container can only be partially filled, and access is cumbersome, since only the material immediately beneath the inner container is accessible.

U.S. Pat. No. 5,366,103 to Abernathy et al. also describes a cereal bowl comprised of a smaller container within a larger container. The space between the upper edges of the containers is open. In the event the bowl is tipped, the cereal in the inner bowl spills into the outer bowl. This alternative has no provision for recovery of the spilled material within the outer bowl and effectively requires discarding the cereal in the event of spillage.

U.S. Pat. No. 6,656,514 to Tubbs and U.S. Pat. No. 6,176,384 to Voloshin describe containers for food items, such as cereal flakes, crackers, cookies, and the like, in which the top is covered with a cap having a plurality of flexible, pie-shaped flaps that together form a spill-proof cover. The flaps are flexed in order to access the container contents. The flaps hinder access and prevent viewing of the contents.

There remains a need for a spill-proof container for particulate material that enables easy access to and viewing of the material during normal container usage, but which will prevent spillage of the material if the container is tipped. Preferably, the material within the container is not discharged from its original storage location and is recoverable when the container is returned to the upright position.

SUMMARY OF THE INVENTION

Generally, the present invention addresses this need by providing a spill-proof container for particulate material that is comprised of a bowl with an access opening, and a bowl support for holding the bowl so that the bowl remains in an upright orientation and the access opening is covered by a part of the bowl support when the container is tipped. The support includes an open-top chamber in the shape of a truncated sphere, i.e., a spherical chamber with a slice cut off of the top to form the access opening. The normally upright, open-top bowl is freely rotatable within the chamber relative to the support, with the support and bowl openings being aligned to permit access to the bowl interior when the support and bowl are both in their upright orientation and unaligned to close the bowl access opening when the outer section is not in the upright position.

Preferably, the support includes a base section with an upwardly oriented hemispherical chamber, and a top section with a downwardly oriented truncated hemispherical chamber and an upper access opening formed by truncation at the top of the hemisphere. The base and top sections are releasably joined so that the upper and lower hemispherical openings form a truncated spherical bowl receiving chamber. The access opening in the top section is preferably circular with a given diameter less than the diameter of the chamber. One of the hemispherical sections may include a projection around its edge to releasably attach the sections.

The bowl section of the spill-proof container has an outer wall that is generally in the shape of a truncated sphere, with the truncation forming the access opening into the bowl interior. The bowl has a diameter approximately equal to the chamber diameter, and is freely rotatable within the support chamber. The shape of the interior is not critical to the invention. For maximum volume, however, the interior of the bowl will also be in the shape of truncated sphere.

The bowl should be normally oriented to its upright position, i.e., the center of gravity of the bowl should be below the bowl midpoint, so that the bowl will remain in its upright position when the support is tilted. The design of the bowl or an added weight can be used to ensure that the center of gravity is below the midpoint.

In order to reduce the friction between the outer wall of the bowl and the chamber wall, a part of the bowl wall may be spaced from the chamber wall so that only selected areas of the bowl wall make frictional contact with the chamber wall during rotation of the bowl. Spacing may be achieved by decreasing the diameter of at least a section of the bowl wall or by increasing at least a section of the chamber wall.

For example, the bowl wall may include a continuous annular upper section extending around the bowl access opening, a lower section across the bottom of the bowl, and a continuous middle wall section extending around the middle of the bowl between the upper and lower sections. The middle section may have a diameter less than the upper and middle sections. Thus, when the support is tipped and rotates relative to the bowl, which remains in an upright position, the frictional contact will only be between the chamber wall and the bowl upper and lower wall sections, substantially reducing friction and facilitating freedom of rotation.

Alternatively, the diameter of the bowl wall may be uniform while the support chamber diameter is greater in some areas than in others. For example, the chamber wall may include a continuous annular upper section extending around the chamber access opening, a lower section across the bottom of the chamber, and a continuous middle wall section extending around the middle of the chamber between the upper and lower sections. The middle section may have a diameter greater than the upper and middle sections. Thus, when the support is tipped and rotates relative to the bowl, which remains in an upright position, the frictional contact will only be between the bowl wall and the chamber upper and lower wall sections, again substantially reducing friction and facilitating freedom of rotation.

Other configurations to achieve the reduced friction will be apparent to one skilled in the art after reading the present description. For example, either the bowl wall or chamber wall may be "dimpled" with a plurality of projections, with the ends of the projections having the diameter of the opposing wall.

When used, a solid material is placed in the bowl. For example, the solid material may be a particulate material such as a foodstuff, e.g., cereal, cookies, candy, etc. Alternatively, the foodstuff may be an animal food, such as dog or cat food. The container may also be used for non-food materials, such as parts, supplies, etc. Due to the relatively wide access opening, the material within the bowl is easily viewable, and can be reached by hand or a utensil.

In the event that the base is tipped from its upright position, either partially or completely, the bowl will remain in the upright position due to its center of gravity being below its midpoint. Thus, the chamber and bowl access openings, which are normally in alignment to provide access to the bowl interior, will become nonaligned due to rotation of the chamber access opening to the side of the bowl access opening, and the bowl access opening will be covered by a part of the chamber wall. Depending on the tolerance between the chamber and bowl walls, the closure of the bowl access opening can prevent spillage of liquids in addition to spillage of any solid material content.

Thus, the container of the present invention is suitable for a variety of end uses. For example, the container can be used as a food container by children, invalids and others who may accidentally tip the container over during eating. The container can also be used as a pet food container, or as a holder for any type of solid material that might normally spill when the container is tipped over.

DETAILED DESCRIPTION OF THE INVENTION

Figure 1:
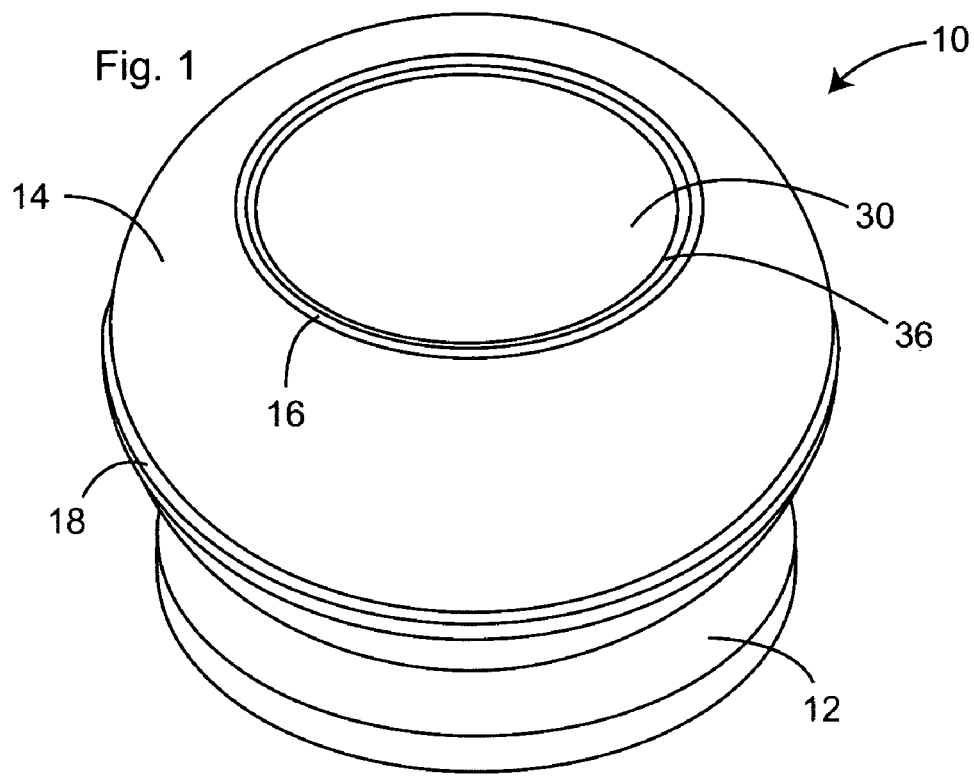
FIG. 1 is a perspective view of the exterior of a container of the present invention.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As shown in FIGS. 1-4, a preferred embodiment of container, generally 10, is comprised of a bowl support formed of base section 12 that includes an upwardly oriented hemispherical chamber and top section 14 that includes a downwardly oriented truncated hemispherical chamber having an upper circular access opening 16. Base section 12 and top section 14 are releasably joined by flange 18 to form a truncated spherical bowl-receiving chamber defined by chamber wall 20. The diameter of access opening 16 is less than the diameter of the chamber, and is preferably from about 25 to about 85% of the diameter of the chamber.

Container 10 further includes bowl 30 having an outer wall 32 that is generally in the shape of a truncated sphere, and an interior chamber 34 that is also in the shape of a truncated sphere but of a smaller diameter than the bowl outer wall 32. Bowl 30 includes an access opening 36 having a diameter approximately equal to the diameter of access opening 16. Outer wall 32 is comprised of continuous annular upper section 38 extending around the periphery of opening 36, a lower section 40 across the bottom of bowl 30, and a middle or intermediate section 42 extending around bowl 30 between upper section 38 and lower section 40.

In order for bowl 30 to remain in its upright, vertical orientation regardless of the orientation of the support, the center of gravity of bowl 30 should be below the center point of bowl 30. As shown in the preferred embodiment, this is achieved by molding weight 44 into the bottom of bowl 30.

Figure 2:
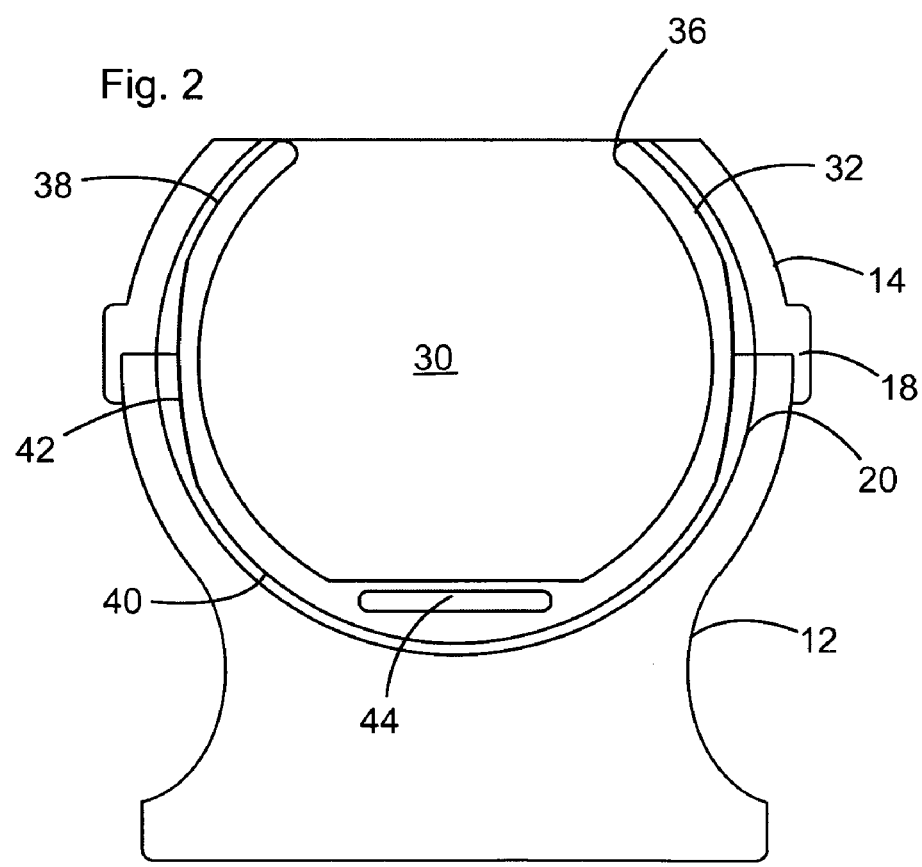
FIG. 2 is a sectional side view of a preferred embodiment of the container in the upright position.
Figure 3:
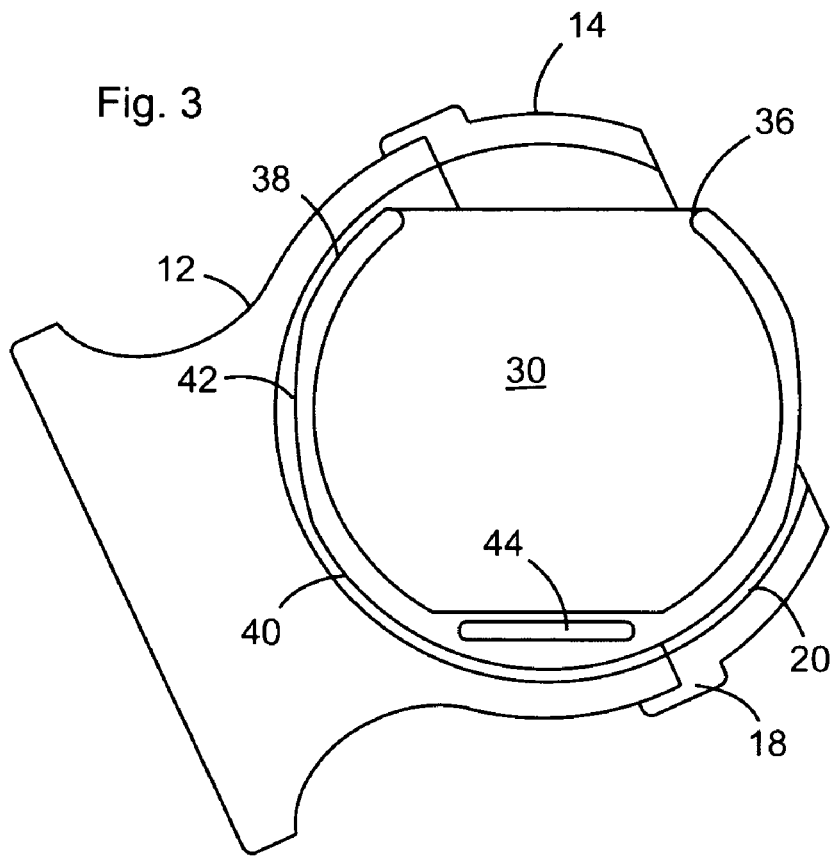
FIG. 3 is a sectional side view of the container of FIG. 2, with the support partially tipped.
Figure 4:
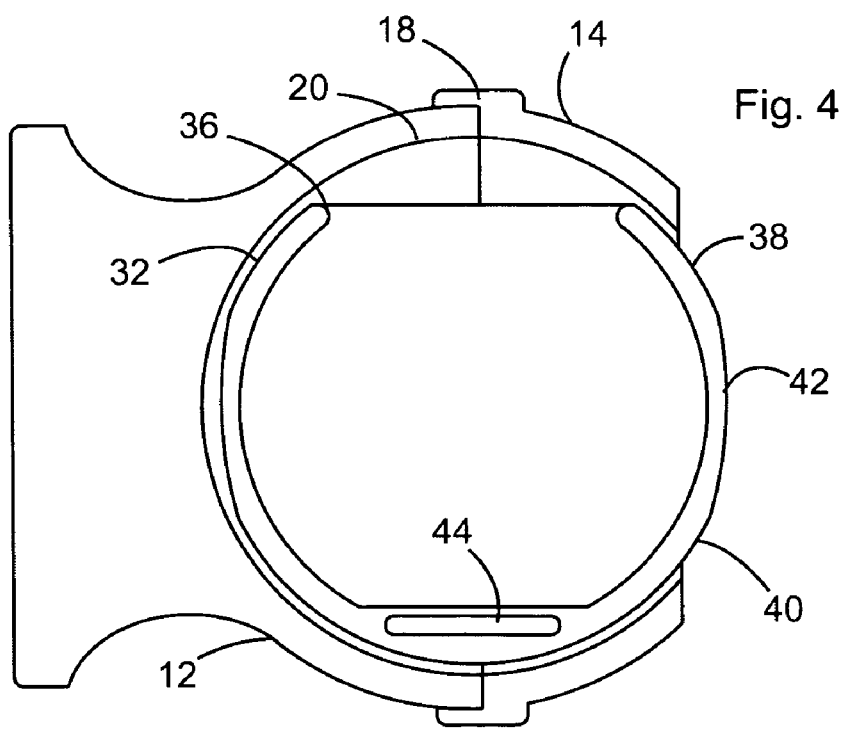
FIG. 4 is a sectional side view of the container of FIG. 2, with the support tipped to approximately 90° for its normally vertical, upright orientation.

As shown in FIGS. 2-4, the diameters of upper section 38 and lower section 40 are approximately equal to the diameter of chamber wall 20, while the diameter of middle section 42 is less than the diameter of chamber wall 20. As illustrated in the drawings, bowl 32 is shown spaced slightly from chamber wall 20 to better illustrate the invention. When actually constructed, however, the diameters of the two walls are substantially the same so long as there is no frictional binding between the walls. Thus, when the support is tipped and rotates relative to bowl 30, which remains in an upright position, the frictional contact will only be between the chamber wall 20 and bowl upper and lower wall sections 38 and 40 respectively, substantially reducing friction and facilitating freedom of rotation.

Figure 5:
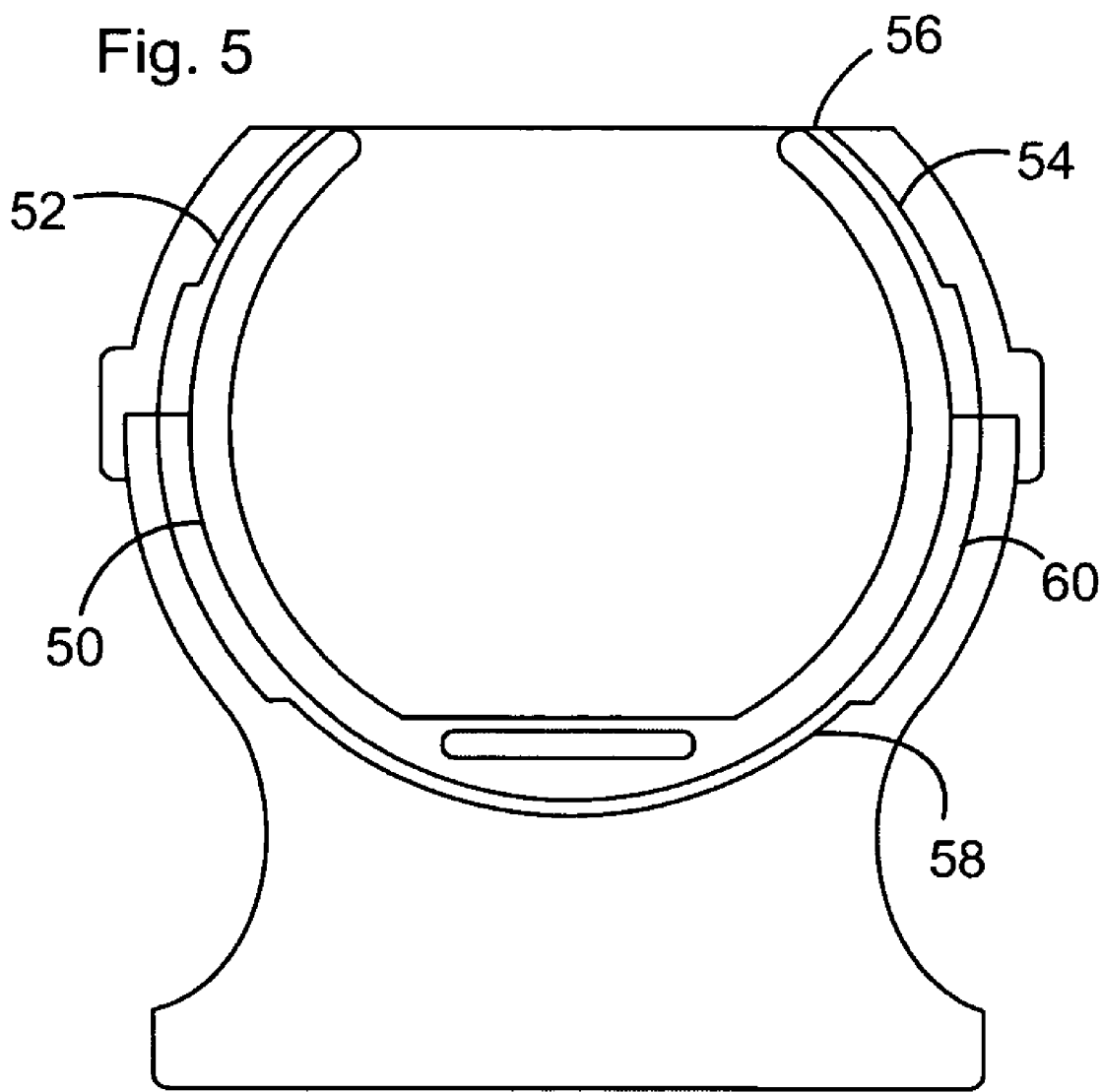
FIG. 5 is an alternative embodiment of the invention in which the chamber wall has an enlarged diameter around its center section.

Alternatively, as shown in the embodiment illustrated in FIG. 5, the diameter of bowl wall 50 may be constant while the diameter of support chamber wall 52 is greater in some sections than in others. As illustrated in FIG. 5, the chamber wall 52 includes a continuous annular upper section 54 extending around chamber access opening 56, a lower section 58, and a continuous middle wall section 60 extending around the middle of chamber wall 52 between the upper section 54 and lower section 58. Middle section 60 has a diameter greater than upper section 54 and lower section 58. Thus, when the support is tipped and rotates relative to the bowl, which remains in an upright position, the frictional contact will only be between bowl wall 50 and upper and lower wall sections 54 and 58, again substantially reducing friction and facilitating freedom of rotation.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A container comprising:
   (a) a bowl support having an upright position, a chamber with a chamber wall in the shape of a truncated sphere, and a chamber access opening dimensioned to permit access by hand to said chamber from an exterior of the container, and
(b) a bowl positioned within said chamber and rotatable, relative to said chamber wall, at least 90 degrees in every rotational direction, said bowl having a bowl outer wall, an upright position, and an interior with a single interior access opening dimensioned to permit access by hand to the interior of said bowl,
(c) wherein, said chamber access opening overlies said single interior access opening, thereby permitting access therethrough by hand to the interior of said bowl from an exterior of the container, when said support and bowl are in respective upright positions, and
(d) wherein said chamber wall prevents access by hand through said interior access opening when said bowl is in its respective upright position and said bowl support is rotated relative to said bowl from its respective upright position to a respective second position.

2. The container of claim 1, wherein said bowl has a midpoint and a center of gravity below said midpoint to maintain said bowl in its upright position.

3. The container of claim 1, wherein part of said bowl outer wall is spaced from said chamber wall.

4. The container of claim 1, wherein said bowl support is comprised of separable upper and lower sections.

5. The container of claim 1, wherein said bowl includes a weighted bottom.

6. The container of claim 1, wherein said bowl is rotatable, relative to said bowl support, 180 degrees in any rotational direction.

7. The container of claim 1, wherein, when said bowl support is rotated into an upside down position from its upright position, said bowl remains in its upright position and said bowl support substantially covers said single interior access opening such that access to the interior of said bowl from the exterior of the container is prevented.

8. A container comprising:
(a) a bowl support having an upright position, a chamber with a chamber wall in the shape of a truncated sphere, and a chamber access opening dimensioned to permit access by hand to said chamber from an exterior of the container, and
(b) a bowl having an outer wall in the shape of a truncated sphere, a normally upright position, and an interior with a single interior access opening dimensioned to permit access by hand to the interior of said bowl, said bowl being freely rotatable within said chamber at least 90 degrees in every rotational direction,
(c) wherein, said chamber access opening overlies said single interior access opening, thereby permitting access therethrough by hand to the interior of said bowl from an exterior of the container, when said support and bowl are in respective upright positions, and
(d) wherein said chamber wall covers said interior access opening when said bowl is in its respective upright position and said bowl support is rotated relative to said bowl from its respective upright position to a respective second position.

9. The container of claim 8, wherein said bowl has a midpoint and a center of gravity below said midpoint to maintain said bowl in its upright position.

10. The container of claim 8, wherein part of said bowl outer wall is spaced from said chamber wall.

11. The container of claim 8, wherein said bowl support is comprised of a base section having an upwardly oriented hemispherical chamber section, and a top section with a downwardly oriented truncated hemispherical chamber section with an upper access opening formed by truncation at the top of the hemisphere, said base and top sections being releasably joined to form a truncated spherical bowl receiving chamber.

12. The container of claim 8, wherein said bowl includes a weighted bottom.

13. The container of claim 8, wherein said bowl is rotatable, relative to said bowl support, 180 degrees in any rotational direction.

14. The container of claim 8, wherein, when said bowl support is rotated into an upside down position from its upright position, said bowl remains in its upright position and said bowl support substantially covers said single interior access opening such that access to the interior of said bowl from the exterior of the container is prevented.

15. A container comprising:
(a) a bowl support having an upright position, a chamber with a chamber wall in the shape of a truncated sphere having a first diameter, and a circular chamber access opening dimensioned to permit access by hand to said chamber from an exterior of the container, the chamber access opening having a second diameter less then said first diameter, and
(b) a bowl having an outer wall in the shape of a truncated sphere and an interior with a single interior access opening dimensioned to permit access by hand to the interior of said bowl, the interior access opening having a third diameter substantially equal to said second diameter, part of said bowl outer wall being spaced from said chamber wall, said bowl being freely rotatable within said chamber at least 90 degrees in every rotational direction.
(c) wherein, said chamber access opening overlies said single interior access opening, thereby permitting access therethrough by hand to the interior of said bowl from an exterior of the container, when said support and bowl are in respective upright positions, and
(d) wherein said chamber wall covers said interior access opening when said bowl is in its respective upright position and said bowl support is rotated relative to said bowl from its respective upright position to a respective second position.

16. The container of claim 15, wherein said bowl support is comprised of a base section having an upwardly oriented hemispherical chamber section, and a top section with a downwardly oriented truncated hemispherical chamber section with an upper access opening formed by truncation at the top of the hemisphere, said base and top sections being releasably joined to form a truncated spherical bowl receiving chamber.

17. The container of claim 15, wherein said bowl includes a weighted bottom.

18. The container of claim 15, wherein the diameter of said single interior access opening is from about 25 to about 85% of the diameter of said chamber.

19. The container of claim 15, wherein the bowl is rotatable, relative to the bowl support, 180 degrees in any rotational direction.

20. The container of claim 15, wherein, when said bowl support is rotated into an upside down position from its upright position, said bowl remains in its upright position and said bowl support substantially covers said single interior access opening such that access to the interior of said bowl from the exterior of the container is prevented.

* * * * *